(12) United States Patent
Djelassi (10) Patent No.: US 11,549,448 B2
(45) Date of Patent: Jan. 10, 2023

(54) METHOD FOR CONTROLLING THE SPEED AND THE POWER OF A TURBINE ENGINE PROPELLER

(71) Applicant: SAFRAN AIRCRAFT ENGINES, Paris (FR)

(72) Inventor: Cedrik Djelassi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 393 days.

(21) Appl. No.: 16/484,037

(22) PCT Filed: Feb. 7, 2018

(86) PCT No.: PCT/FR2018/050306
§ 371 (c)(1),
(2) Date: Aug. 6, 2019

(87) PCT Pub. No.: WO2018/146422
PCT Pub. Date: Aug. 16, 2018

(65) Prior Publication Data
US 2019/0390607 A1    Dec. 26, 2019

(30) Foreign Application Priority Data
Feb. 7, 2017  (FR) ..................... 1750999

(51) Int. Cl.
*F02C 9/58* (2006.01)
*B64C 11/30* (2006.01)
(Continued)

(52) U.S. Cl.
CPC .............. *F02C 9/58* (2013.01); *B64C 11/305* (2013.01); *B64D 27/10* (2013.01);
(Continued)

(58) Field of Classification Search
CPC ....................................................... F02C 9/58
See application file for complete search history.

(56) References Cited

U.S. PATENT DOCUMENTS

| 4,958,289 A * | 9/1990 | Sum ...................... B64C 11/305 |
| | | 701/99 |
| 8,568,096 B2 * | 10/2013 | Eglin .................... G05D 1/0858 |
| | | 416/1 |

(Continued)

FOREIGN PATENT DOCUMENTS

| CN | 101905742 A | 12/2010 |
| CN | 101905743 A | 12/2010 |

(Continued)

OTHER PUBLICATIONS

International Preliminary Report on Patentability received for PCT Patent Application No. PCT/FR2018/050306, dated Aug. 22, 2019, 12 pages (6 pages of English Translation and 6 pages of Original Document).

(Continued)

*Primary Examiner* — Kayla McCaffrey
(74) *Attorney, Agent, or Firm* — Womble Bond Dickinson (US) LLP (57) ABSTRACT

The invention relates to a method for controlling the speed and the power of a turbine engine propeller, wherein at least two operating modes are implemented: —one operating mode, called "speed mode", in which the pitch ($\beta$) of the propeller is controlled as a function of the desired propeller speed, while the fuel flow is controlled as a function of the desired torque; the other operating mode, called "$\beta$ mode", in which the fuel flow is controlled as a function of the desired propeller speed, the pitch ($\beta$) of the propeller being set to a limit angle ($\beta$min) that limits the pitch of the propeller in the two operating modes, the pitch angle ($\beta$min (Continued)

(t)) being continuously computed and updated during a flight on the basis of parameters relating to the flight conditions estimated in real time.

9 Claims, 6 Drawing Sheets

(51) Int. Cl.
 *B64D 27/10* (2006.01)
 *B64D 27/00* (2006.01)
(52) U.S. Cl.
 CPC .... *B64D 2027/005* (2013.01); *F05D 2260/77* (2013.01); *F05D 2270/024* (2013.01)

(56) References Cited

U.S. PATENT DOCUMENTS

| 2002/0171005 | A1 | 11/2002 | Claudet |
| 2007/0110577 | A1* | 5/2007 | Danielson ............ B64C 11/305 416/1 |
| 2010/0310371 | A1 | 12/2010 | Eglin |
| 2013/0323050 | A1 | 12/2013 | Kleckler |
| 2015/0314853 | A1 | 11/2015 | Tantot et al. |
| 2015/0360789 | A1 | 12/2015 | Lissajoux et al. |

FOREIGN PATENT DOCUMENTS

| CN | 104936859 A | 9/2015 |
| JP | 60-076499 A | 4/1985 |
| JP | 62-001690 A | 1/1987 |
| JP | 02-211335 A | 8/1990 |
| JP | 05-032199 A | 2/1993 |
| JP | 06-247392 A | 9/1994 |
| JP | 09-032581 A | 2/1997 |
| JP | 09-032582 A | 2/1997 |
| JP | 11-255199 A | 9/1999 |
| JP | 2006-213168 A | 8/2006 |
| JP | 2007-050869 A | 3/2007 |
| WO | 2014/083259 A1 | 6/2014 |

OTHER PUBLICATIONS

Office Action received for Chinese Patent Application No. 201880010527.9, dated Jun. 1, 2021, 9 pages (2 pages of Partial English Translation and 7 pages of Office Action).
International Search Report and Written Opinion received for PCT Patent Application No. PCT/FR2018/050306, dated May 30, 2018, 14 pages (6 pages of English Translation and 8 pages of Original Document).
Preliminary Research Report received for French Application No. 1750999, dated Oct. 24, 2017, 3 pages (1 page of French Translation Cover Sheet and 2 pages of original document).
Office Action received for Japanese Patent Application No. 2019-542503, dated Nov. 9, 2021, 10 pages (5 pages of English Translation and 5 pages of Office Action).

* cited by examiner

METHOD FOR CONTROLLING THE SPEED
AND THE POWER OF A TURBINE ENGINE
PROPELLER

GENERAL TECHNICAL FIELD AND PRIOR
ART

The invention relates to the power regulation of the turboprop engines.

In modern turboprop engines, the rotational speed of the propeller and the power transmitted to the propeller are monitored through regulators acting on two parameters: the setting of the propeller of the turboprop engine and the flow rate of fuel injected into the combustion chamber.

Two modes of regulation are conventionally used and alternate according to the phases of operation.

In a mode called "speed mode", the speed of the propeller is regulated by the control of its setting angle. In this mode, the fuel flow rate is used to define the torque or power delivered to the propeller.

In another mode, called "beta mode", the rotational speed of the propeller is monitored by the fuel flow rate, the setting of the propeller being defined based on the flight conditions and on the throttle.

In this configuration, the setting is generally defined to correspond to a minimum pitch below which the propeller no longer operates in the propellant mode and thereby no longer dissipates the energy transmitted thereto.

In a turboprop engine, the rotational speed of the propeller can be expressed by an equation derived from the energy balance of the power plant:

$$Pw_T - Pw_H = J_{Tot} \cdot \omega_p \cdot \frac{d\omega_p}{dt}$$

The external powers applied to the system being the power delivered by the power turbine $Pw_T$ and the power dissipated by the propeller $Pw_H$, this equation expresses a variation of the kinetic energy of the propeller, via the moment of inertia $J_{Tot}$ of the propeller/power turbine/transmission shaft assembly and the rotational speed of the propeller $\omega p$ when the powers applied to this propeller are no longer balanced. The means for monitoring the rotational speed of the propeller are therefore for modulating the power delivered by the engine, via the injected fuel flow rate and the power dissipated by the propeller.

This power dissipated by the propeller can be expressed as:

$$Pw_H = CP * \rho * n^3 * D^5$$

The power coefficient is noted (CP), $\rho$ being the air density, n the rotation rate of the propeller (number of revolutions per minute), D the diameter of the propeller.

The power coefficient of a propeller is a data for expressing the power dissipated by the propeller, and consequently the efficiency of this propeller.

During the phases of operation of the aircraft, it may happen that the power coefficient drops, or even becomes zero in some cases. The traction power of the propeller is then cancelled, and the energy provided by the engine to the propeller is then no longer dissipated. This accumulation of energy results in an increase in the rotation rate of the propeller outside its operating range, the propeller is then considered as being in overspeed.

In more critical cases, the action of the relative wind on the propeller transmits additional energy thereto, thus switching the value of the power coefficient CP in the negative range, reflecting the energy input of the propeller to the mechanical elements of the engine. This self-acceleration phenomenon represents not only a danger for the behavior of the aircraft but also for its mechanical elements.

It is therefore necessary to guarantee the propellant operation of the propeller by monitoring the parameters affecting the power coefficient CP to maintain it above a minimum limit value of the power coefficient CPmin, determined through study during the design. The minimum limit of the power coefficient CPmin can take different values based on different flight parameters, in particular speed and altitude. Tables of minimum limit values of power coefficient CPmin are then established based on these parameters.

The difficulty of estimating the minimum power coefficient CPmin causes the aircraft manufacturer to adopt significant operating margins in the choice of a minimum setting abutment βmin, corresponding to the setting of the propeller when the power coefficient CP has a minimum limit value CPmin. The power regulation system is therefore deprived of part of its exploitable operating range. This loss is all the more experienced during operating stages requiring a very short pitch, such as in descent or in slow motion. Therefore, this causes instabilities of the control system that fails to maintain the engine rate in these cases of operation.

GENERAL PRESENTATION OF THE
INVENTION

A general object of the invention is to solve the issues of the prior art.

In particular, an object of the invention is to increase the estimation accuracy of the minimum setting value ensuring that the propeller remains in its propellant mode of operation.

Another object of the invention is to continuously and iteratively estimate the minimum setting value ensuring that the propeller remain in its propellant mode of operation.

According to one aspect, the invention relates to a method for regulating the speed and power of a turbomachine propeller, in which at least two modes of operation are implemented:
 the one, called "speed mode", in which the setting of the propeller (β) is controlled based on the desired propeller speed, while the fuel flow rate is controlled based on the desired torque,
 the other, called "β mode", in which the fuel flow rate is controlled based on the desired propeller speed, the setting of the propeller being defined at an abutment angle which limits the setting of the propeller in both modes of operation,
characterized in that the abutment angle is continuously calculated and updated during a flight based on parameters related to the flight conditions estimated in real time.

Such a method is advantageously completed by the following different characteristics taken alone or in all their possible combinations:
 the abutment angle is continuously calculated and updated by an estimation loop iteratively correcting the abutment angle based on the parameters related to the flight conditions estimated in real time, as well as on a minimum power coefficient value estimated in design;
 a parameter of flight conditions estimated in real time and used in the continuous calculation and update of the abutment angle is a helical Mach and/or a coefficient of advance;

the estimation loop implements at each iteration the following processing:

Acquisition of the flight condition parameters;

Determination, based on these parameters and on an abutment angle of the previous iteration, of a power coefficient associated with these parameters and with this abutment angle;

Comparison of this power coefficient with a minimum power coefficient defined in design;

According to the error signal at the output of this comparison step, update of the abutment angle by a correction function;

during the determination step, the value of the power coefficient is determined based on a previously stored table of power coefficients;

the value of the minimum power coefficient varies based on one or more parameters;

it includes a detection of achievement of the abutment angle, this detection triggering the switchover from the "speed mode" to the "β mode";

the regulation of the fuel flow rate implements a power monitoring loop and a tracking loop of the propeller speed setpoint;

it includes an integrator common to said loops of the different modes of regulation of the fuel flow rate.

The invention also relates to a turbomachine including processing means implementing a regulation method of the aforementioned type.

PRESENTATION OF THE FIGURES

Other characteristics and advantages of the invention will emerge from the following description, which is purely illustrative and non-limiting, and should be read with in relation to the appended figures in which.

DESCRIPTION OF ONE OR MORE MODES OF IMPLEMENTATION AND EMBODIMENTS

Continuous Estimation, Iteratively, of the Setting Abutment

The proposed method continuously estimates and updates during a flight the minimum setting abutment angle βmin based on parameters related to the flight conditions estimated in real time.

This estimation is made by a computer on-board an aircraft to control the turboprop engine and regulate the power therein. This computer implements a servo-control loop of the type of the loop 1 illustrated in FIG. 1.

Figure 1:
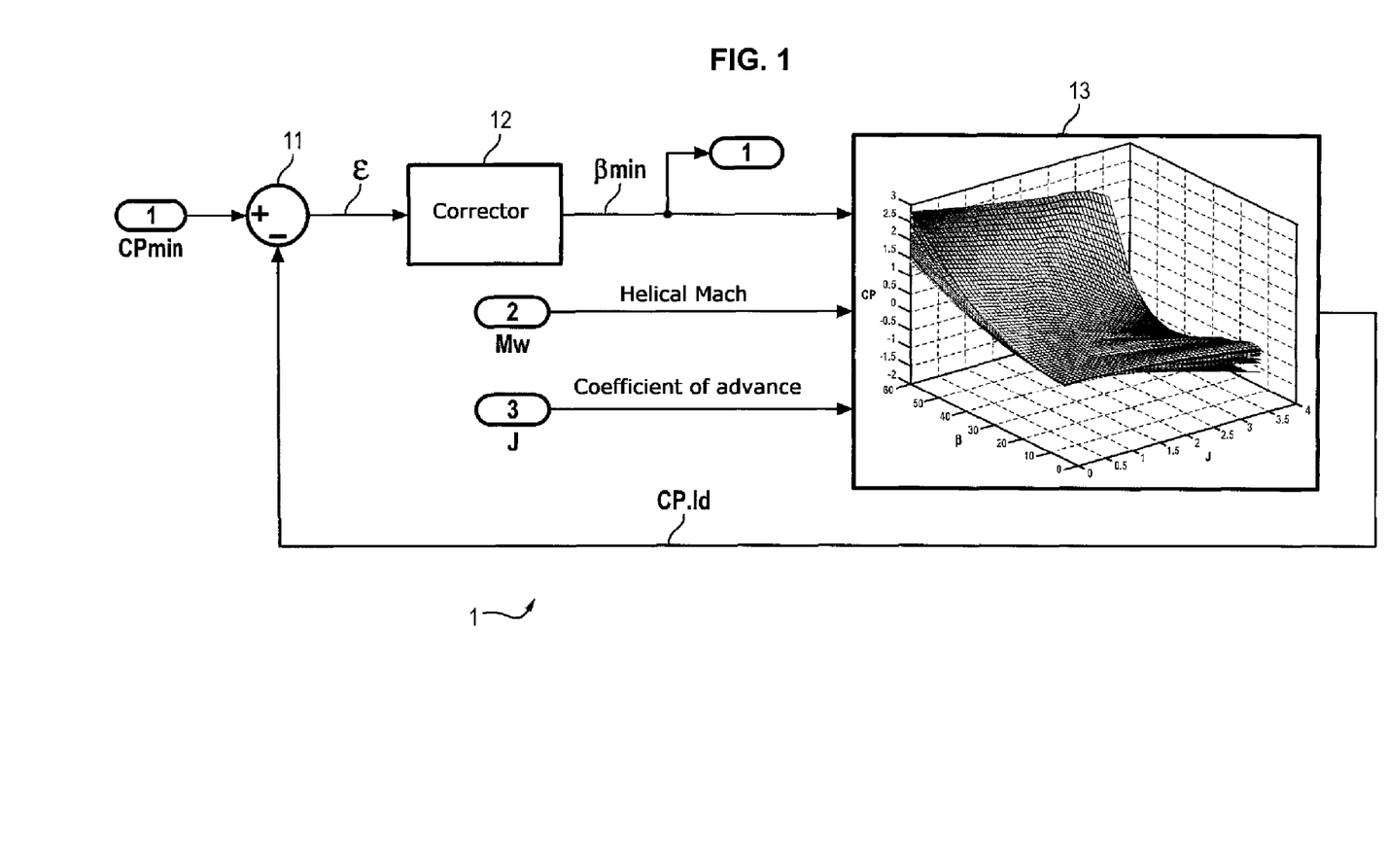
FIG. 1 is a schematic representation of the operation of the system for estimating the value of the setting abutment βmin corresponding to the real-time flight conditions.

The servo-control loop 1 includes three input parameters:

the minimum helical power coefficient CPmin initially determined in design by sensitivity studies, a helical Mach expressed at 70% of the propeller radius Mw(t), a coefficient of advance J(t).

The minimum power coefficient value CPmin is for example a reference value used for all the flight conditions.

It can also be variable and take different discrete values over time based on different parameters such as speed or altitude.

The minimum power coefficient CPmin(t) is injected into a comparator 11 with an identified power coefficient CP.Id (t). The error ε at the output of this comparator 11 (difference between the minimum power coefficient CPmin and the identified power coefficient CP.Id (t)) is injected into a corrector 12.

This retained corrector 12 may be an integral proportional corrector of the following expression:

$$C(z^{-1}) \frac{1}{\text{Gain2}} \left[ 1 + \frac{(1-z^{-1})}{Te} \cdot \tau_2 \right] \cdot \frac{Te}{(1-z^{-1})}$$

where:

z is the input parameter

Te, Gain2 and $T_2$ are parameters of the corrector

The corrector 12 transforms the differential error it receives as input into a signal corresponding to the setting abutment value βmin(t) ensuring the propulsive mode of operation of the propeller at the flight conditions at this instant t.

The output value βmin(t) of the corrector 12 is then injected into a memory of the computer used for the turboprop engine power regulation, where it replaces the old setting abutment value.

This output value is also sent, with the instantaneous value of helical Mach Mw(t) and the coefficient of advance J(t), as input of a block 13 storing a mapping of power coefficients CP.

This block 13 and the mapping it stores allow the identification of a minimum power coefficient CP.Id(t+1) based on its input parameters. The coefficient CP.Id(t+1) is then re-injected into comparator 11 to be compared with the minimum coefficient CPmin defined in design.

This example describes an embodiment in which the mapping of the power coefficient values CP takes into account three parameters is not limiting. It is conceivable to take into account a different number of parameters to refine or simplify this mapping.

This loop is continuously iterated during the entire flight.

Figure 2:
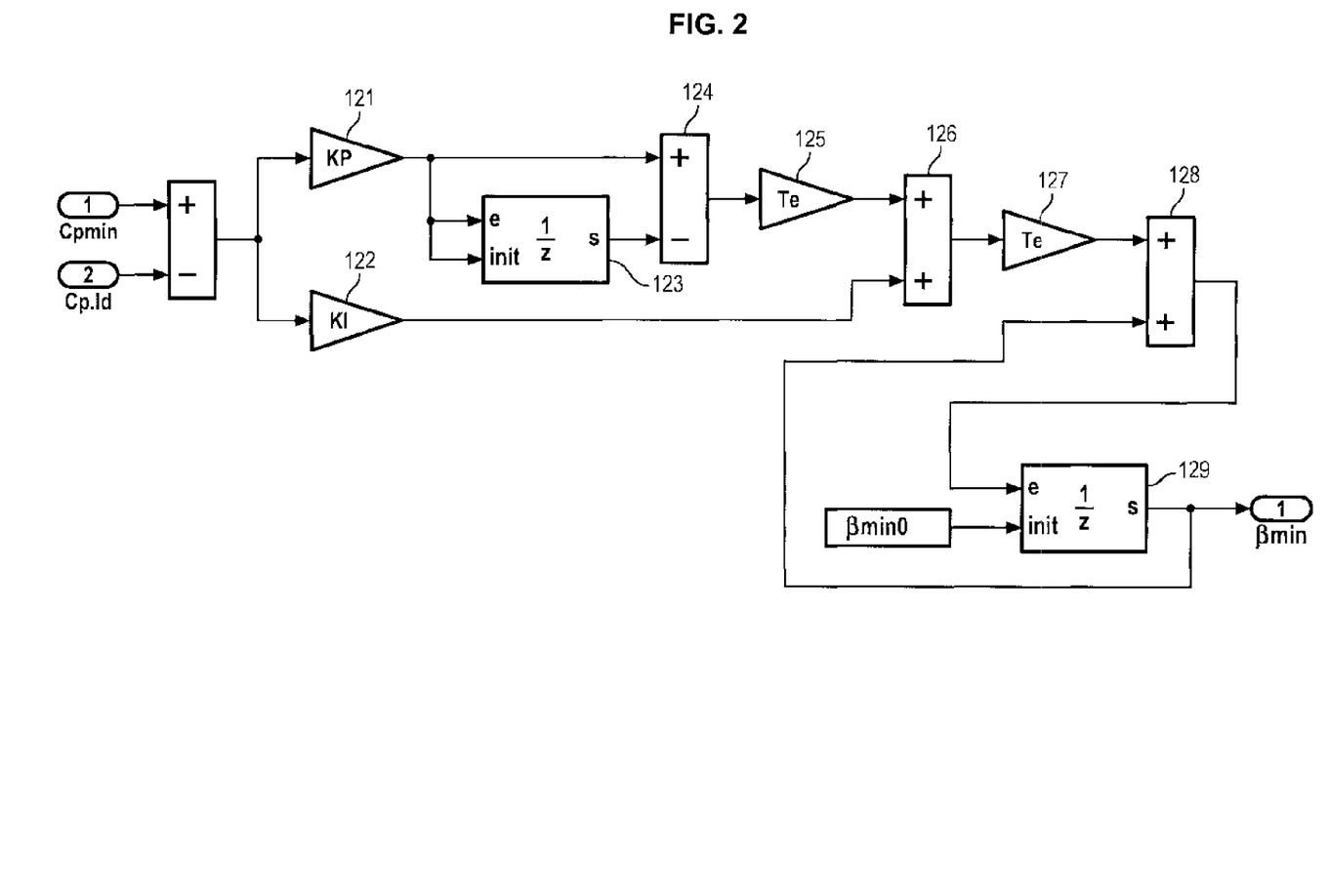
FIG. 2 is a schematic representation in the form of block diagram of the operation of the corrector used in the calculation loop of the setting abutment βmin.

With reference to FIG. 2, the corrector 12 receives as input the difference between the minimum power coefficient CpMin and the identified power coefficient CpId. This input is injected into two static gains 121 and 122.

The output of the static gain 121 is injected into an integrator 123 and a summer 124.

The summer 124 subtracts the output of the integrator 123 from the output of the static gain 121.

The output of the summer 124 is injected into a static gain 125 whose output is added by a summer 126 to the output of the static gain 122.

The output of the summer 126 is then injected into a static gain 127 whose output is injected into a summer 128, adding the output of the static gain 127 to the output signal βmin.

The output of this summer 128 is injected into an integrator 129 whose initialization value is a security value βmin0.

The coefficients of the different static gains 121, 122 are adjusted empirically.

The static gains 125 and 127 correspond to the sampling and calculation period of the corrector.

Figure 3:
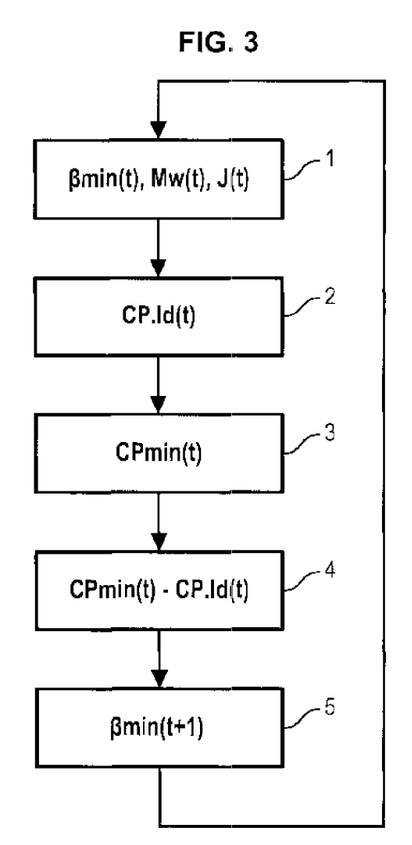
FIG. 3 is a representation in the form of a flowchart of the steps of the method for continuously estimating, iteratively, the setting abutment βmin.

FIG. 3 shows the same method in the form of a flowchart.

A first step (step 1) corresponds to the acquisition of the parameters that will allow carrying out the method for identifying the setting abutment βmin, in this case the memory setting abutment βmin(t), the helical Mach Mw(t) and the coefficient of advance J(t).

During the initialization of the system, the first iterative pitch therefore takes, as a value of βmin, a security value βmin0 independent of the external parameters.

These parameters are used in a second step (step 2) to identify the corresponding power coefficient CP.Id(t) on the mapping 13 of power coefficient CP.

After a reading of the minimum power coefficient value CPmin(t) defined in design (step 3), the two power coefficient values are injected into the comparator 11 (step 4).

The difference will be then corrected in the corrector 12 so as to transform the input information into a setting abutment modification setpoint βmin(t+1) (step 5).

The minimum setting abutment βmin is therefore calculated continuously and iteratively by comparing a power coefficient CP.Id continuously identified, with a minimum power coefficient CPmin defined in design, ensuring the propellant mode of operation of the propeller.

Mapping of the Power Coefficient

Figure 4:
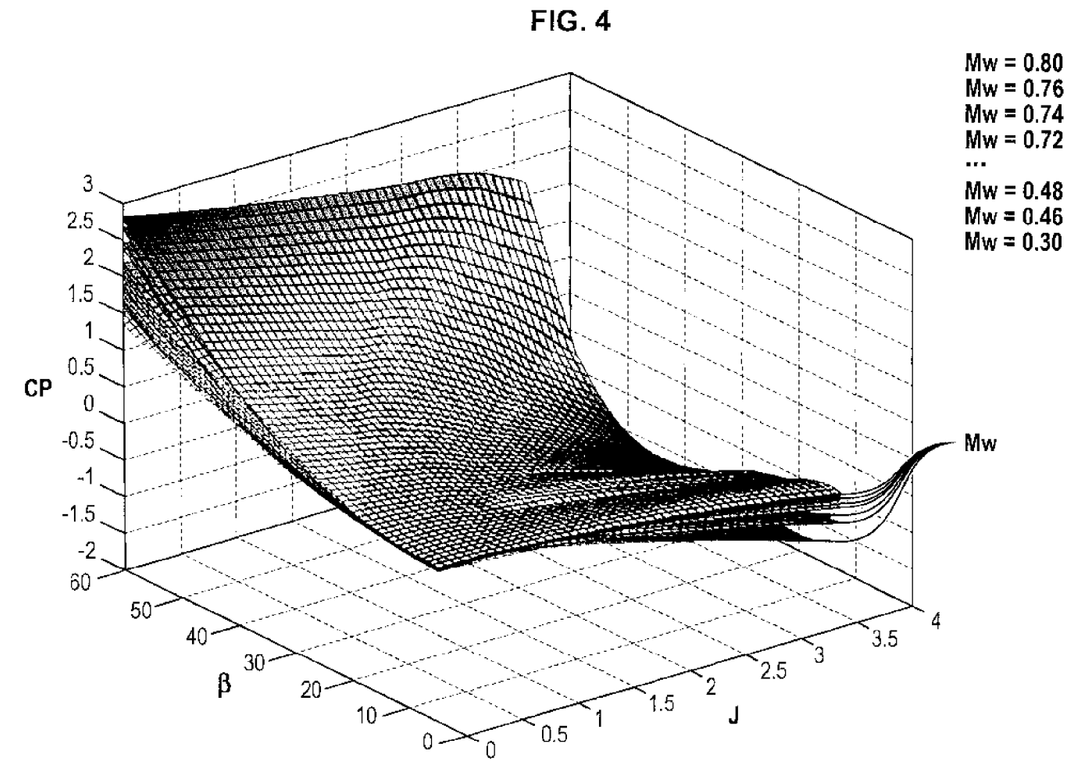
FIG. 4 represents a mapping of the power coefficient of the propeller CP based on the coefficient of advance J, on the helical Mach at 70% of the propeller radius Mw and on the propeller setting β.

With reference to FIG. 4, a mapping of the power coefficient CP as used in the block 13 is determined at the design stage and takes into account the three influencing parameters which are:

The helical Mach Mw expressed at a distance from the axis of rotation equivalent to 70% of the radius of the propeller. It can be expressed as a function of the flight speed here noted VTAS, of the peripheral propeller speed here noted Utip and of the speed of sound here noted cson according to the formula:

$$Mw = \frac{\sqrt{VTAS^2 + (0.7 \cdot Utip)^2}}{cson}$$

With Utip=π*n*D expressing the diameter of the propeller D and the rotation rate of the propeller n in revolutions/second.

The coefficient of advance J can be expressed as a function of the flight speed VTAS, of the rotation rate n and of the helical diameter D according to the formula:

$$J = \frac{VTAS}{n \cdot D}$$

The propeller setting angle β.

These three parameters continuously change during the flight based on the conditions, it results in that the power coefficient of the propeller CP also varies according to the phases of operation of the aircraft.

This power coefficient CP, defined by the propeller manufacturer during the design according to the request of the aircraft manufacturer, is then mapped based on the variations of the parameters chosen to express it. The mapping 13 is refined during the design by the propeller manufacturer and then by the aircraft manufacturer to minimize the estimation uncertainties.

The different sets of power coefficient values CP correspond to different values of helical mach Mw comprised here between 0.30 and 0.80. These bounds are however not limiting and, it being obvious that the variation of the helical mach Mw is continuous, this representation is only intended to highlight the impact of the different parameters.

Setting Abutment Detection

The use of this identification of minimum setting abutment βmin occurs during the power regulation mode called "speed mode", adjusting the rotational speed of the propeller by affecting the setting β.

When this abutment value is reached, the propeller rate cannot be maintained. The system must switch from the regulation mode called "speed mode" to the "β mode".

Figure 5:
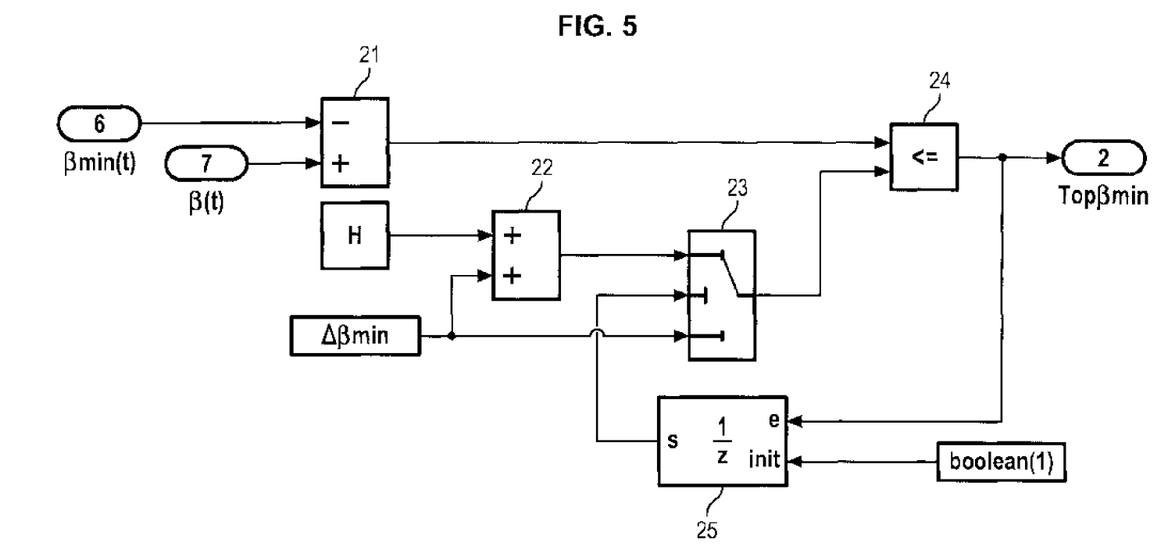
FIG. 5 is a schematic representation of the operation of the comparison system between the value of β and that of βmin for detecting the achievement of the abutment value by β.

With reference to FIG. 5, the permutation from one mode to the other is triggered by means of a system for detecting the achievement of the minimum setting abutment 2.

The loop for detecting the achievement of the setting abutment includes 4 input parameters:

The setting abutment βmin(t)

The propeller setting β(t)

The setting abutment update pitch Δβmin

A margin of operation H causing a hysteresis effect

At the loop input, the setting of the propeller 13(t) and the setting abutment βmin(t) are injected into a comparator 21. This comparator 21 subtracts the setting abutment βmin(t) from the propeller setting β(t).

The other two inputs, the margin of operation H and the setting abutment update pitch Δβmin are injected into a summer 22.

The output signal of the summer 22 is injected into a selector with 3 inputs 23 outputting the output signal of the summer 22.

The output signals of the comparator 21 and of the selector 23 are injected into a logic operator 24, which will emit an output signal when the two input signals are equal.

A binary signal Topβmin is emitted at a logical level associated with 1 when the difference between the setting β and the setting abutment Δβmin is smaller than the variation of the setting abutment Δβmin added to a margin defined in design, causing a hysteresis effect. This margin thus avoids repeatedly switching from one regulation mode to the other in the case of an operation stabilized at the limit of the switching value.

This can be expressed by the equation:

TopβMin=TRUE if: β=βMin+ΔβMin+/−H

When the signal emitted Topβmin by this control permutation system is true, the regulation mode changes, switching from "speed mode" to "β mode".

Topβmin is returned to the selector 23 via an integrator 25.

Permutation Between "Speed Mode" and "β Mode"

Figure 6:
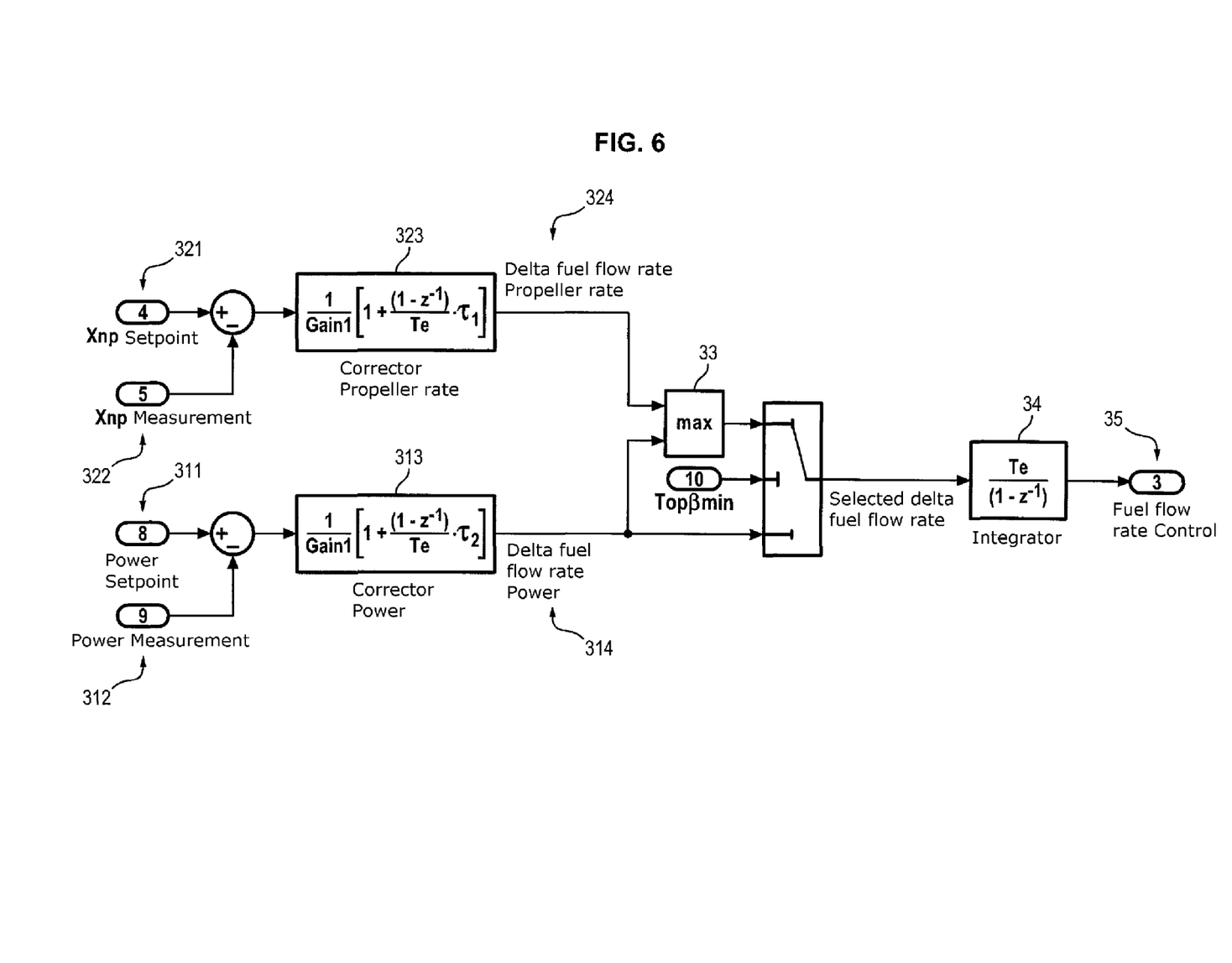
FIG. 6 is a schematic representation of the operation of the system for regulating the flow rate of fuel injected into the combustion chamber.

With reference to FIG. 6, a power regulation system 3 allows modulating the fuel flow rate in order to follow the propeller speed setpoint. More specifically, the existence of two fuel flow rate control loops is detailed.

One of the loops corresponds to a control of the power via the fuel flow rate 31, associated with the operation of the "speed mode".

The power setpoint of the motor 311 is compared with the measured power 312. The difference is injected into a corrector 313 to be transformed into a fuel flow rate variation setpoint 314 for adjusting the power to follow the setpoint.

The second loop corresponds to a propeller rotation rate control 32, more precisely to the support of the propeller rate by matching of power via the fuel flow rate, associated with the operation of the "β mode".

The propeller rate setpoint 321, therefore the engine rate setpoint, because the setting β is defined in this mode, is compared with the measured rate 322. The difference is injected into a corrector 323 to be transformed into a fuel flow rate variation setpoint 324 for following the engine rate setpoint.

When the output signal of the abutment detector Topβmin is detected as true, these two setpoints 314, 324 are compared by an operator 33.

The fuel flow rate control loop proposing the largest fuel flow rate variation control will therefore prevails over the other one, corresponding to an operator "max".

The term integrator 34 of the correctors is switched at the end of the loop, subsequently to the operator max 33, in order to integrate only the difference between the effective control 35 of the system and the response thus avoiding a "wind up" effect of the system.

The invention claimed is:

1. A regulation method comprising implementing at least a speed mode of operation and a β mode of operation for regulating a speed and a power of a turbomachine propeller,
   wherein, in the speed mode, a setting of the turbomachine propeller is controlled based on a desired propeller speed, while a fuel flow rate is controlled based on a desired torque,
   wherein in the β mode, the fuel flow rate is controlled based on the desired propeller speed, the setting of the turbomachine propeller being defined at an abutment angle which limits the setting of the propeller in the speed mode and in the β mode,
   the method comprising continuously calculating and updating the abutment angle during a flight based on parameters related to flight conditions estimated in real time,
   wherein the abutment angle is continuously calculated and updated by an estimation loop iteratively correcting the abutment angle based on the parameters related to the flight conditions estimated in real time, and a minimum power coefficient value estimated in design.

2. The regulation method according to claim 1, wherein one of the parameters is a helical Mach or a coefficient of advance.

3. The regulation method according to claim 1, wherein the estimation loop implements at each iteration the following processing:
   acquisition of the parameters,
   determination, based on the parameters and on an abutment angle of a previous iteration, of a power coefficient associated with the parameters and with the abutment angle,
   comparison of the power coefficient with the minimum power coefficient value defined in design, and
   according to an error signal at an output of the comparison step, update of the abutment angle by a correction function.

4. The regulation method according to claim 3, wherein, during the determination step, the value of the power coefficient is determined based on a previously stored table of power coefficients.

5. The regulation method according to claim 1, wherein the value of the minimum power coefficient varies based on one or more parameters.

6. The regulation method according to claim 1, wherein it includes a detection of achievement of the abutment angle, this detection triggering a switchover from the speed mode to the β mode.

7. The regulation method according to claim 1, wherein a regulation of the fuel flow rate implements a power monitoring loop and a tracking loop of a propeller speed setpoint.

8. The regulation method of claim 7, wherein it includes an integrator common to the loops of the speed mode and β mode of regulation of the fuel flow rate.

9. A turbomachine including a propeller, and
   processing means configured for implementing a regulation method,
   the regulation method comprising implementing at least a speed mode of operation and a β mode of operation for regulating a speed and a power of the propeller,
   wherein, in the speed mode, a setting of the propeller is controlled based on a desired propeller speed, while a fuel flow rate is controlled based on a desired torque,
   wherein in the β mode, the fuel flow rate is controlled based on the desired propeller speed, the setting of the propeller being defined at an abutment angle which limits the setting of the propeller in the speed mode and in the β mode,
   the method comprising continuously calculating and updating the abutment angle during a flight based on parameters related to flight conditions estimated in real time;
   wherein the abutment angle is continuously calculated and updated by an estimation loop iteratively correcting the abutment angle based on the parameters related to the flight conditions estimated in real time, and a minimum power coefficient value estimated in design.

* * * * *